Figure 3:
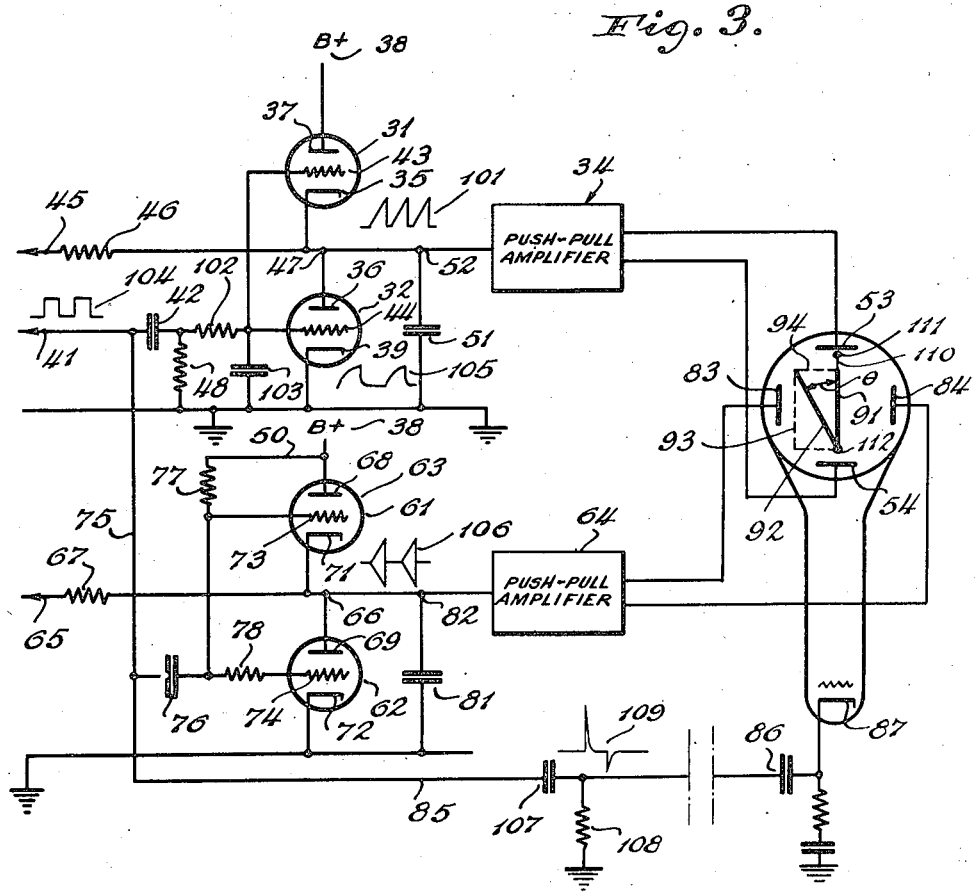

March 22, 1949.　　　　J. D. MALLETT　　　　2,464,822
INDICATING DEVICE
Filed Aug. 16, 1943　　　　　　　　　　　　2 Sheets-Sheet 1
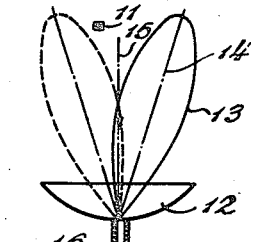
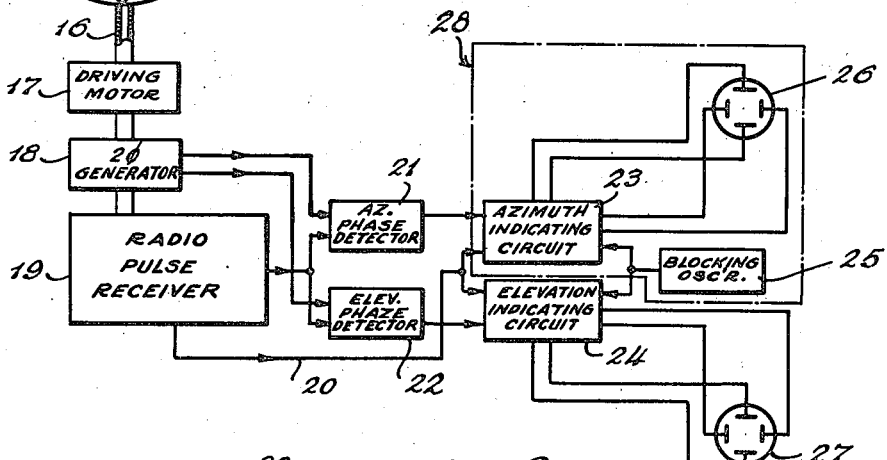
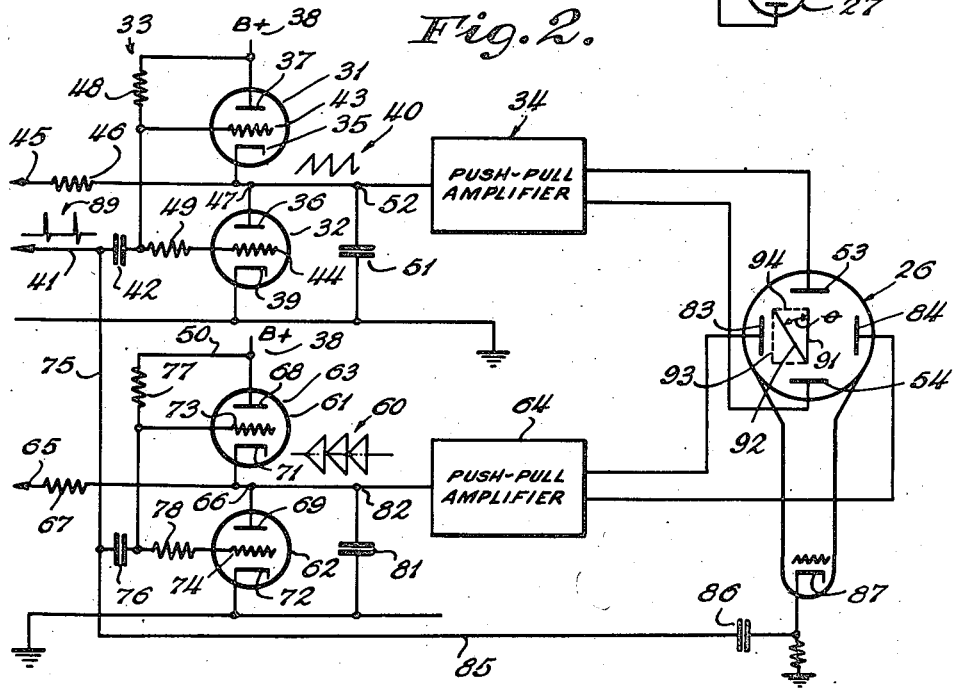
INVENTOR
JOHN D. MALLETT
BY
ATTORNEY March 22, 1949. J. D. MALLETT 2,464,822
INDICATING DEVICE
Filed Aug. 16, 1943 2 Sheets-Sheet 2

INVENTOR
JOHN D. MALLETT
BY
ATTORNEY

Patented Mar. 22, 1949

2,464,822

UNITED STATES PATENT OFFICE 2,464,822

INDICATING DEVICE

John D. Mallett, Garden City, N. Y., assignor to The Sperry Corporation, a corporation of Delaware Application August 16, 1943, Serial No. 498,765

9 Claims. (Cl. 343—113)

My invention relates to indicating devices in general, and more particularly to cathode-ray tube indicators. As an essential part of a conical scan, microwave radio object locator system, an indicator must be provided which will enable the operator to direct the transmission of radio waves toward the object to be detected in such a manner that the axis of rotation of the transmitted wave pattern is pointing directly toward the target.

This indicator must therefore register the relative position of the target with respect to such axis in order that the operator may physically move the transmitting antenna in azimuth and elevation until the axis of rotation of the wave pattern is brought into alignment with the target and thereafter to maintain this alignment by "tracking the target."

In present systems it is common practice to employ two instruments known to the art as "tracking indicators," one for azimuth and one for elevation indication. The first of these instruments indicates whether the axis of rotation of the wave pattern is to the right or left of the target, and the second whether it is above or below the object. Each instrument indicates what is termed in the art as "error."

Thus, if the axis of rotation of the wave pattern is to the right or left of the target, the azimuth tracking indicator will indicate right or left error as the case may be, and if above or below the target, the elevation tracking indicator will register a vertical error with reference to a zero point. The transmitting antenna is then physically oriented with respect to the target until both indicators are in zero registry and the system is said to be "on" the target.

It is with indicating apparatus such as that described that my invention deals, and, while the indicator forming the subject matter of the present application is not limited to employment in any particular type of apparatus or system, it is particularly useful as a tracking indicator and accordingly will be described in connection with a radio object locator system.

Since all radio object locator systems are dependent upon the reception of reflected radio signals, their receiving apparatus is subject to random fluctuations or noise which in the case of prior art tracking indicators give an indication of error from noise that is not distinguishable from that produced by a true signal.

The instruments referred to employ a pointer which is responsive to a voltage that varies about a reference point in accordance with the amount of error received in the system. Thus, if the pointer is made to operate at a vertical position for zero error, it may, in the case of azimuth indication, be deflected to the left to indicate left error and to the right to indicate right error. When random fluctuations are present, the instrument pointer may be caused to fluctuate from right to left giving the operator a false indication of error and thereby causing him to attempt to track a target by making adjustments to the movable antenna. If under these circumstances the locator is being used to supply a computer with data for the purpose of laying guns or directing searchlights, the computer is constantly being supplied with extraneous data.

Prior indicating mechanisms make no provision for informing the operator that the object being tracked is passing through a series of changes in attitude. For different attitudes of an object, such as an airplane, different reflecting surfaces are presented and as a result, signals of varying strength are reflected and received by the detector system which are in turn transmitted to the indicating device. These signals, due to their rapidly changing strength, produce error indications which may cause the operator to attempt the tracking of a target prematurely or prior to the time it has assumed a steady course and is in a proper attitude for tracking.

Furthermore, the sensitivity of these instruments changes with signal strength making them subject to fading. Under such conditions the indicator pointer is caused to oscillate with changes in signal strength even though the error is actually constant, thus falsely indicating that the error is changing.

Since error indication is made by the deflection of a pointer to right or left, these instruments make no provision for indicating signal strength and accordingly afford the operator no choice in the objects which are to be tracked. Thus, a target which is located some distance from the transmitting station will reflect signals which are weaker than those reflected from an object within close proximity of the apparatus. Since no indication of relative signal strength is made, it is impossible for the operator to distinguish between near and distant objects and no selection of the target can be made. It is advantageous, however, in locating hostile aircraft that a selection of the target be made, since otherwise the operator might track a distant plane when he should be tracking an object closer to the detector system.

In some applications, the above-mentioned characteristics of pointer instruments are undesirable and accordingly it is an object of my invention to provide an improved tracking indicator which will eliminate the disadvantages described above with respect to prior art apparatus.

It is also an object of my invention to provide a cathode ray tube indicator capable of indicating error and relative signal strength simultaneously.

It is another object of my invention to provide a cathode ray tube indicator for a radio detector system which will enable the operator to distinguish between close targets and distant objects.

As another object of my invention, I wish to provide a cathode ray tube indicator for radio detecting systems which will not give false indications of error.

Yet another object of my invention is to provide an indicating device which is responsive to two voltages, one proportional to signal strength and the other chiefly proportional to the error voltage of a radio detector system.

As another object of my invention, I wish to provide a cathode ray tube indicating device, the tube of which is responsive to two deflecting voltages respectively proportional to signal strength and to a varying quantity, which are converted from direct current voltages into sweep voltages by clamping circuit means.

Still another object of my invention is to provide an indicator which is responsive to a signal but whose sensitivity is independent of signal strength.

Other objects and advantages of my invention will become apparent as the description proceeds.

In carrying out my invention in a preferred embodiment thereof and in connection with its application to a radio detector system, I provide an electronic circuit comprising two channels in which sweep voltages are produced for delivery to the vertical and horizontal deflecting plates of a cathode ray tube upon whose screen is projected the desired indication.

Within the first channel, I utilize a voltage produced in the automatic volume control circuit of the system's receiver, which is proportional to signal height, by converting the same into a sweep voltage, with a clamping circuit which is triggered by pulses received from a blocking oscillator. The reference point or level of the clamping circuit is determined by the circuit's parameters and is set at approximately the level of the AVC voltage when no signal is being received by the system, so that, insofar as the indication provided by the vertical sweep is concerned, the indication given is a straight line which is proportional to signal strength.

In the other channel of the circuit a voltage, also a function of signal height, from the system's phase sensitive device or detector is likewise converted into a deflecting voltage to be applied between the horizontal plates of the cathode ray tube. The sweep voltage here produced is obtained by means of a clamping circuit similar to that in the first channel which is maintained at a reference or zero level corresponding to that maintained by the output of the phase sensitive device for zero error indication.

The outputs of each of the respective clamping circuits may be amplified by means of push-pull amplifiers before delivery to the deflecting plates of the indicating cathode ray tube, if desired, or may be delivered directly thereto.

With the circuit just described, an indication is provided on the screen of the cathode ray tube which is in the form of a straight vertical line for zero error indication or a straight line made at an angle with the vertical for either right or left error indication, which pivots about a point coincident with the lower terminus of the vertical indication.

A more comprehensive understanding of my invention will be afforded by the following detailed description when taken together with the accompanying drawing in which like reference numerals have been used throughout to designate like parts and in which, Fig. 1 is a schematic block diagram of a radio locating system in connection with which the invention of the present application is employed, Fig. 2 is a schematic diagram of an embodiment of my invention, Fig. 3 is a schematic diagram of a modified form of my invention.

In the radio locator system illustrated in Fig. 1, an area in which an object 11 is located is scanned by a beam having a lobe 13 and a center line 14 which is rotated about an axis 15. This scanning beam is produced by revolving a parabolic reflector 12 carrying a dipole antenna (not shown) through a shaft 16 with a motor 17 which is mechanically connected to a two-phase generator 18. Signals reflected from the target 11 are received by the same antenna from which transmission is made and conducted to the receiver 19, wherein they are filtered in a circuit responsive to the signals' modulation frequency equal to the spin frequency of parabolic reflector 12. Then within an azimuth phase detector 21 and an elevation phase detector 22, both of which are also referred to as phase sensitive amplifiers, the filtered signals are compared respectively with one phase of the output of the two-phase generator 18 to produce an error voltage for delivery to my improved indicating device 28 comprising an azimuth indicator circuit 23 and cathode ray tube 26 in the case of azimuth indication, and an elevation indicator circuit 24 and cathode ray tube 27 in the case of elevation indication.

To the indicator circuits, only one of which will be described, there are also delivered a voltage, responsive to signal amplitude, which is taken from the automatic volume control circuit of the receiver 19 by a line 20 and a triggering voltage taken from blocking oscillator 25. Both the automatic volume control voltage and the voltage from the phase sensitive device in each of the indicator circuits are converted into sweeps, for example in accordance with the embodiment of my invention illustrated in Fig. 2, for delivery to the horizontal and vertical deflecting plates of the cathode ray tubes of indicators 26 and 27.

In the embodiment illustrated in Fig. 2, a pair of electronic discharge devices 31 and 32, illustrated as triodes, are connected together as a clamping circuit to form a sweep wave generator 33, in which a voltage from the automatic volume control circuit of receiver 19 is converted into a sweep wave for delivery to a push-pull amplifier 34. Tubes 31 and 32 are connected in series, the cathode 35 of the former being connected to plate 36 of the latter. Plate 37 of element 31 is connected directly to positive energy source 38, while cathode 39 of discharge device 32 is connected to ground.

A triggering pulse from blocking oscillator 25 (Fig. 1) is impressed upon the circuit at input terminal 41 for delivery, through the blocking condenser 42, to grids 43 and 44, respectively, of tubes 31 and 32. The voltage from the automatic volume control circuit of receiver 19 is impressed upon the circuit at input terminal 45, from which point it is conducted through a resistor 46 to a common connecting point 47. Biasing resistors 48 and 49 are connected in the grid circuits of tubes 31 and 32, respectively, and across the output of the latter element 32 is connected a condenser 51. The output of clamping circuit 33 is taken from the terminal point 52 by a suitable conductor and supplied to a push-pull amplifier 34, which is optional in the circuit, where it is amplified for delivery to the vertical deflecting plates 53 and 54 of cathode ray tube 26.

Within the second channel of the circuit a pair of electronic discharge devices 61 and 62, also illustrated as triodes, are connected in the manner explained above to form a clamping circuit 63 which provides a sweep wave for delivery to push-pull amplifier 64. For application to this channel of the circuit, the voltage from phase sensitive device 21 (Fig. 1) is delivered to input terminal 65 and through resistor 67 to point 66. Elements 61 and 62 are provided with the usual anodes 68 and 69 and cathodes 71 and 72, respectively, which are connected as outlined above for the clamping circuit of the first channel.

Grids 73 and 74 of these devices are connected together and also receive the triggering voltage from blocking oscillator 25 through input terminal 41, conductor 75, and coupling condenser 76. The grids are provided with biasing resistors 77 and 78, respectively. A condenser 81 is connected in parallel with electron discharge device 62 and the output of the circuit is taken from terminal 82 for delivery to the push-pull amplifier 64, which also is optional in the circuit. Here the sweep is amplified for delivery to horizontal deflecting plates 83 and 84 of cathode ray tube 26.

A blanking pulse for removing retrace is supplied to cathode 87 of cathode ray tube 26 from blocking oscillator 25 through input terminal 41, conductor 75, line 85, and coupling condenser 86.

The clamping circuit 33 of the first channel operates in a conventional manner and is connected so as to produce a saw tooth wave 40. The circuit parameters are of such values that for zero or very low signal strength the voltage at 52 is the same as that at 45, and when tubes 31 and 32 are conducting the voltage at 52 becomes more positive with increased signal strength. When positive pulses are applied to terminal 41, the bias on the grids of all four tubes 31, 32, 61 and 62 is adjusted, due to grid current and the time constant formed by condensers 42 and 76 and resistors 48 and 77, so that for the duration of each of the pulses the tubes are operated at zero bias and maintain each of the points 52 and 82 at a particular voltage.

During the interval between pulses the tubes are cut off and the points 52 and 82 are allowed to assume the voltages of the points 45 and 65, respectively. The points 52 and 82 change their voltages exponentially with time when the tubes are cut off because of the resistor-condenser combinations 46, 51 and 67, 81 of their respective channels. The time constant of the two sections must be the same to produce a straight line. The resultant wave form at each of points 52 and 82 is in general a saw tooth wave.

When considered alone, sweep 40 produces a line indication 91 on the cathode ray tube screen which is proportional to the amplitude of the incoming signal received by receiver 19.

Since clamping circuit 63 is so connected as to maintain the point 82, in its clamped position, at a level corresponding to zero error indication, this circuit, under the operation explained above with reference to clamping circuit 33, produces a sweep voltage 60 which is positive or negative with respect to point 82 depending upon the rise or fall of error voltage about the zero error level. The portion of this sweep voltage which is above the line obtains when a plus error voltage is received at terminal 65, and that below the line when the error voltage falls below the zero error level. The magnitude of the error voltage depends both upon the extent of the error and upon the amplitude of the received signal. This sweep voltage is also amplified, if desired, in push-pull amplifier 64 and delivered to the horizontal plates of tube 26.

Under the influence of both deflecting voltages an indication in the form of a straight line, which has a length proportional to signal strength, is provided which makes an angle $\theta$ with the vertical and which bears to the right or left thereof, depending on whether a right or left error signal is being received. This indication, for example, left error 92, will be made up of a vertical component 93 and a horizontal component 94, which are respectively proportional to the A. V. C. voltage received on input terminal 45 and the phase sensitive detector or amplifier output received on input terminal 65.

The angle $\theta$, which indication 92 makes with the vertical, is proportional to the inverse tangent of the error voltage, and is not a function of signal level. Thus, an indication is provided whose sensitivity is independent of the strength of the signal received by receiver 19, and for constant error indication, the line forming the right or left error indication will make an angle $\theta$ with the vertical which is independent of signal strength, the length of the line only changing with an increase or decrease thereof.

The retracted portions of both sweeps are removed by the pulse supplied to cathode 87 of cathode-ray tube 26 from the blocking oscillator 25.

Since the cathode ray tube is instantaneously responsive to signals received by the system illustrated in Fig. 1, and since it has no moving parts which will attempt to follow random fluctuations or noise, it is possible for the operator to distinguish between a true signal and noise, thus avoiding erroneous indications and false tracking. Also due to the change in length of the line forming the indication, with a change in signal strength, it is possible for the observer to determine the relative strength of the signals which are being received and thereby to determine the relative distance of the target from the detector system.

In a similar manner it is possible for the observer to note changes in attitude which a target may be assuming, and to delay his tracking operation until the reflected signal is of constant strength.

Also, since the line produced for right or left error is made up of vertical and horizontal components which vary equally with signal strength, the direction of the line indication on the fluorescent screen remains approximately uniform for constant error indication, although the error signal is changing. Thus, the angular sensitivity of the indicator is not changed appreciably by fading, the only result being a change in the length of the visible line forming the indication.

It may be desirable to provide the indicator with a positive zero error indication, or a reference line, to which right and left error indications may be referred. Although such a line could be inscribed on the face of the tube screen, it is desirable that it be produced electrically as a part of the indication, since a fixed reference would require illumination and the circuit would have to be adjusted to it. A cathode-ray reference line may be obtained with the modified form of my invention, illustrated in Fig. 3.

Within this circuit all connections are identical with those in the form illustrated in Fig. 2 and described above, with the exception that an integrating network has been included in the grid circuit of element 32 and a differentiating network in line 85 connecting cathode 87 of tube 26 with input terminal 41.

The changes made comprise connecting the resistor 48 to ground rather than to positive energy source 38, as shown in Fig. 2; the introduction of integrating parameters comprising a resistor 102 and a capacitor 103 into the grid circuit of elements 31 and 32; and the introduction of differentiating elements 107 and 108 in line 85.

The operation of the circuit is unchanged, but the sweep voltages produced are slightly different in form. Thus the wave form 40, appearing at junction 52 in the circuit, is changed to that indicated as 101 due to the action of the integrating network in conjunction with the impression on the input terminal 41 of a slightly longer pulse which is shown in wave form 104. Due to the same action the wave form of the sweep appearing at junction 82 is changed to that illustrated by the wave 106. In combination, the longer pulse and the integrating elements 102 and 103 supply the grids of tubes 31 and 32 with a signal such as 105.

When no signal is received by the system the indication on the screen of tube 26 appears as a dot 112, but when a zero error signal is received a reference line 110, terminated with an intensified spot 111, is present. Superimposed on the reference line 110 is another line 91 proportional to signal strength, the same being the zero error indication. This effect is due to the delaying action of the integrating circuit which causes the voltage inpressed on the vertical deflecting plates 53 and 54 of tube 26 to continue to rise after the sweep appearing on the horizontal plates 82 and 84 has terminated. The intensified portion or dot 111 of the reference line 110 is caused by the slow rate of increase of the vertical deflecting voltage in point of time beyond the termination of the voltage on the horizontal deflecting plates.

When a right or left error indication is received a similar result obtains, as far as the reference line 110 is concerned. For example, the left error indication 92 will be accompanied by the reference line 110, the latter forming part of the completed indication to which the left error 92 may be referred. The entire indication thus produced is formed by the concurrent rise in both horizontal and vertical deflections to a point terminating the left error indication. Beyound this point the horizontal sweep drops and the voltage on the vertical deflecting plates of the tube continues to rise. Unless corrective measures are taken, the continued rise of the vertical deflecting plate voltage will appear on the screen as a line coincident with the horizontal component 94. Since that portion of line 110 extending above the horizontal component 94, which is caused by the continued rise in vertical plate voltage, is desirable, the horizontal retrace only is removed. This is accomplished by the action of the differentiating circuit inserted in the cathode lead 85, which provides deintensification or blanking of the signals during the horizontal sweep. The action of the differentiating network comprising capacitor 107 and resistor 108 produces a wave form 109, which when received on cathode 87 blanks out the signal and also produces the dot 112 on reference line 110.

With the modified circuit just described an error indication is provided which has as a part thereof a reference line that appears at all times when a signal is being received by the system. This reference line provides a marking point for zero error indication which does not require illumination, and makes adjustment of the circuit to a reference line unnecessary.

Another arrangement for securing a similar result is disclosed in copending patent application Serial No. 498,929 filed on August 17, 1943, now Patent No. 2,437,286, issued March 9, 1948, by Marcus K. Witt, and having the same assignee as the present application.

Where in this specification and the appended claims the expression "clamping circuit" is used, it will be understood that reference is made to a circuit in which either amplitude extreme of a waveform impressed on the circuit is maintained at a certain potential level.

Modifications of my invention are, of course, possible, and may present themselves in view of the foregoing disclosure and description, and accordingly the representations and illustrations herein made are to be taken as illustrative only and not in a restricted sense, and my invention is to be considered as of such breadth as is defined by the appended claims.

What is claimed is:

1. A cathode ray tube indicator comprising a cathode ray tube having a pair of deflecting plate circuits, separate means for producing a plurality of direct current voltages, and means for converting said direct current voltages into sweep voltages, said last-mentioned means including a source of pulses and clamping circuits.

2. In combination with a radio detector system, a receiver having means for producing an A. V. C. voltage proportional to the strength of a received signal, a phase sensitive amplifier for producing a voltage proportional to a varying quantity, indicating means responsive to a plurality of sweep voltages, and separate means interposed respectively between said receiver and said phase sensitive amplifier and said indicating means for converting the outputs of these devices into sweep voltages, said separate means including a common source of pulses and individual clamping circuits.

3. An indicator, comprising the combination of a cathode ray tube having sets of deflecting plates, means for impressing upon one of said sets of plates a voltage proportional to the strength of a signal, means for applying a voltage proportional to a varying quantity on another set of said deflecting plates, and separate means for converting each of the deflecting plate voltages into a sweep voltage, said separate means including a common source of pulses and individual clamping circuits.

4. A tracking indicator comprising a cathode ray tube having vertical and horizontal deflecting plates, separate means including a clamping circuit for generating sweep waves respectively applied to said vertical and horizontal deflecting plates, and signal means for controlling said clamping circuits to produce sweep voltages respectively proportional to the strength of a signal and to a varying quantity.

5. In combination, a receiver having an A. V. C. voltage output, a phase sensitive device, a source of pulses, means for combining said A. V. C. voltage and said pulses to provide a first sweep wave, means for converting the output of said phase sensitive device and said pulses to provide a second sweep wave, and means responsive to said first and second sweep waves to produce an indication.

6. An indicator, comprising a cathode ray tube having a screen, means for projecting a vertical reference line on said screen, plural means including a source of pulses and clamping circuits for projecting an error indication line on said screen, and separate signal means for controlling each of said error line-projecting means.

7. In combination with a radio detector system, a tracking indicator, comprising a cathode ray tube having a screen, means for projecting a reference line on said screen, means including a source of pulses and a clamping circuit for projecting an error indicating line on said screen, and signal means for controlling said line-projecting means.

8. In an indicator, a cathode ray tube having a screen, means for projecting a vertical reference line on said screen, means including a source of pulses and a clamping circuit for projecting an error indicating line on said screen which pivots about the lower terminus of said reference line, and signal means for controlling said line projecting means.

9. A cathode ray tube indicator comprising a cathode ray tube having a pair of deflecting plate circuits, separate means for producing a plurality of direct current voltages, and means for converting said direct current voltages into sweep voltages, said last-mentioned means including a source of pulses and clamping circuits, said clamping circuits comprising thermionic tube means for receiving said direct current voltages and for establishing a fixed starting reference position for producing the trace on said cathode ray tube.

JOHN D. MALLETT.

REFERENCES CITED

The following references are of record in the file of this patent:

UNITED STATES PATENTS

| Number | Name | Date |
|---|---|---|
| 1,978,684 | McCreary | Oct. 30, 1934 |
| 2,059,004 | Leeds | Oct. 27, 1936 |
| 2,153,140 | Diehl et al. | Apr. 4, 1939 |
| 2,220,183 | Ulbricht | Nov. 5, 1940 |
| 2,237,604 | Marique | Apr. 8, 1941 |
| 2,312,203 | Wallace | Feb. 23, 1943 |
| 2,347,529 | Wheeler | Apr. 25, 1944 |
| 2,412,291 | Schade | Dec. 10, 1946 |